US012169051B2

(12) United States Patent
Hunecke et al.

(10) Patent No.: US 12,169,051 B2
(45) Date of Patent: Dec. 17, 2024

(54) LIGHT MODULE, HEADLIGHT, MOTOR VEHICLE AND METHOD FOR PRODUCING THE LIGHT MODULE

(71) Applicant: HELLA GmbH & Co. KGaA, Lippstadt (DE)

(72) Inventors: Katrin Hunecke, Bad Sassendorf (DE); Martin Kappelhoff, Bad Sassendorf (DE); Sebastian Scholz, Soest (DE); Ralf Seiger, Lippstadt (DE); Franz-Georg Willeke, Anroechte (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 41 days.

(21) Appl. No.: 17/956,497

(22) Filed: Sep. 29, 2022

(65) Prior Publication Data

US 2023/0024973 A1 Jan. 26, 2023

Related U.S. Application Data

(63) Continuation of application No. PCT/EP2021/057061, filed on Mar. 19, 2021.

(30) Foreign Application Priority Data

Mar. 31, 2020 (DE) ..................... 10 2020 108 894.9

(51) Int. Cl.
*F21S 41/19* (2018.01)
*F21S 41/148* (2018.01)
(Continued)

(52) U.S. Cl.
CPC ............. *F21S 41/36* (2018.01); *F21S 41/148* (2018.01); *F21S 41/192* (2018.01); (Continued)

(58) Field of Classification Search
CPC .......... F21S 41/36; F21S 41/321; F21S 41/39; F21S 45/47; F21S 45/49; F21S 41/192;
(Continued)

(56) References Cited

U.S. PATENT DOCUMENTS

| | | | |
|---|---|---|---|
| 9,500,332 | B2 | 11/2016 | Jackl et al. |
| 10,222,033 | B2 | 3/2019 | Yasuda et al. |

(Continued)

FOREIGN PATENT DOCUMENTS

| | | | |
|---|---|---|---|
| AT | 516303 | A1 | 4/2016 |
| DE | 102016213778 | A1 | 2/2017 |

(Continued)

OTHER PUBLICATIONS

Search English translation of WO-2018161988-A1 (Year: 2018).*
International Search Report dated May 18, 2021 in corresponding application PCT/EP2021/057061.

*Primary Examiner* — Omar Rojas Cadima
(74) *Attorney, Agent, or Firm* — Muncy, Geissler, Olds & Lowe, P.C.

(57) ABSTRACT

A light module for a headlight of a motor vehicle, the light module having: a circuit board having at least one illuminating device for emitting light, wherein the circuit board has a longitudinal extent along a Y-axis, a width extent, extending perpendicular to the longitudinal extent, along an X-axis, and a vertical extent, extending perpendicular to the longitudinal extent and the width extent, along a Z-axis; a reflector; and a heat sink on which the circuit board is fastened. The heat sink is fastened to the reflector via a first fastener in such a manner that the first fastener secures a first referencing structure and/or a second referencing structure of the reflector against the circuit board such that the at least one illuminating device is located in a reference position in the direction of the Y-axis and in the direction of the X-axis relative to the reflector.

17 Claims, 4 Drawing Sheets

(51) Int. Cl.
*F21S 41/32* (2018.01)
*F21S 41/36* (2018.01)
*F21S 41/39* (2018.01)
*F21S 45/47* (2018.01)

(52) U.S. Cl.
CPC ............. *F21S 41/321* (2018.01); *F21S 41/39* (2018.01); *F21S 45/47* (2018.01)

(58) Field of Classification Search
CPC ......... H05K 2201/066; F21W 2107/10; F21W 2102/13; F21W 2103/20
See application file for complete search history.

(56) References Cited

U.S. PATENT DOCUMENTS

| | | | | |
|---|---|---|---|---|
| 10,247,379 | B2 | 4/2019 | Grafeneder et al. | |
| 10,634,329 | B2 | 4/2020 | Kanamori | |
| 2016/0363285 | A1 | 12/2016 | Mornet | |
| 2019/0041024 | A1* | 2/2019 | Yamaguchi | F21S 41/148 |
| 2019/0368707 | A1* | 12/2019 | Kanamori | F21V 5/007 |
| 2020/0003387 | A1* | 1/2020 | Hess | F21S 41/39 |

FOREIGN PATENT DOCUMENTS

| | | | | |
|---|---|---|---|---|
| DE | 102015220794 | A1 | 4/2017 | |
| DE | 102015225664 | A1 | 6/2017 | |
| DE | 202017102811 | U1 | 6/2017 | |
| DE | 102016120431 | A1 | 4/2018 | |
| DE | 102017122560 | A1 | 3/2019 | |
| DE | 102017130100 | A1 | 6/2019 | |
| DE | 102019208094 | A1 | 12/2019 | |
| DE | 202018107292 | U1 | 3/2020 | |
| EP | 3450828 | A1 | 3/2019 | |
| EP | 3540297 | A1 | 9/2019 | |
| WO | WO2014028955 | A1 | 2/2014 | |
| WO | WO-2018161988 | A1 * | 9/2018 | F21S 41/148 |

* cited by examiner

LIGHT MODULE, HEADLIGHT, MOTOR VEHICLE AND METHOD FOR PRODUCING THE LIGHT MODULE

This nonprovisional application is a continuation of International Application No. PCT/EP2021/057061, which was filed on Mar. 19, 2021, and which claims priority to German Patent Application No. 10 2020 108 894.9, which was filed in Germany on Mar. 31, 2020, and which are both herein incorporated by reference.

BACKGROUND OF THE INVENTION

Field of the Invention

The present invention relates to a light module for a headlight of a motor vehicle, to a headlight for a motor vehicle, to a motor vehicle, and to a method for producing the light module.

Description of the Background Art

Light modules, as they are used in headlights of motor vehicles, have a reflector and a circuit board arranged in a reference position to it. To be precise, an illuminating device is arranged in a reference position on the circuit board opposite the reflector. As a result, the illuminating device assumes a predetermined position relative to the reflector in order to optimally cast the light emitted by the illuminating device onto the reflector and be reflected from it. The reflected light passes through a headlight cover lens in the headlight and illuminates the road.

To establish the reference position, the circuit board is usually fastened to the reflector in the three coordinate directions that are perpendicular to one another. This secures the reference position in the assembly process of the light module and prevents the reference position from changing during operation of the headlight.

It is desirable to make the circuit board as small as possible, because its size is a major cost driver of the light module, not least because of the material usage. When the circuit board is fastened to the reflector, this is not always easy to accomplish. It is also desirable to be able to easily compensate for manufacturing tolerances and to implement the production of the reference position by simple and inexpensive means.

SUMMARY OF THE INVENTION

It is therefore an object of the present invention to provide an improved light module that is simple and inexpensive in its production.

The above object is achieved, in particular by a light module for a headlight of a motor vehicle, a headlight for a motor vehicle, a motor vehicle, and a method. In this regard, features and details disclosed in relation to the light module of the invention also apply, of course, in relation to the headlight of the invention, to the motor vehicle of the invention, and to the method of the invention, and conversely in each case, so that with regard to the disclosure, reference is or can always be made mutually to the individual aspects of the invention.

According to an exemplary embodiment of the invention, the object is achieved by a light module for a headlight of a motor vehicle, the light module having: a circuit board having at least one illuminating device for emitting light, wherein the circuit board has a longitudinal extent along a Y-axis, a width extent, extending perpendicular to the longitudinal extent, along an X-axis, and a vertical extent, extending perpendicular to the longitudinal extent and the width extent, along a Z-axis; a reflector; and a heat sink on which the circuit board is fastened, wherein the heat sink is fastened to the reflector via a first fastener in such a manner that the first fastener secures a first referencing structure and/or a second referencing structure of the reflector against the circuit board such that the at least one illuminating device is located in a reference position in the direction of the Y-axis and in the direction of the X-axis relative to the reflector.

A simple way of compensating for manufacturing tolerances is created due to the fact that the first fastener secures, in particular places, the first referencing structure and/or the second referencing structure against the circuit board, and thereby forms the reference position in the direction of the Y-axis and in the direction of the X-axis. Further, it is not necessary to dimension the circuit board particularly large in order to secure it against the reflector, because the circuit board does not have to be fastened to the reflector, for instance, therefore screwed onto it, for instance, but can be secured in other ways, in particular placed against it.

Accordingly, the first fastener can be positioned relative to the first referencing structure and/or to the second referencing structure of the reflector and/or the first fastener can be arranged such that, when the first fastener is fastened to the heat sink and the reflector, the heat sink moves relative to the reflector such that the first referencing structure and/or the second referencing structure are placed against the circuit board and thus the at least one illuminating device reaches the reference position in the direction of the Y-axis and in the direction of the X-axis relative to the reflector.

The at least one illuminating device can be designed as any type of lighting device, for example, a light-emitting diode or LED. Accordingly, the light module can also be referred to as an LED light module. The circuit board can be formed of at least partially or predominantly of copper.

The selected designation of elements, such as referencing structure, for example, as first, second, etc., serves solely to distinguish the elements from one another. This does not imply that if a second element is named, a first element must also be present. Only the elements mentioned in the main claim are relevant for the scope of protection and this is independent of their designation as first, second, etc., but solely dependent on their occurrence in the main claim.

The first referencing structure and/or the second referencing structure can in particular be designed as a contact with at least one contact surface for contact with another element. Thus, the securing and referencing occur accordingly by contact with the other element.

It can be provided that the first fastener is a screw mounted in a thread of the reflector. This is an easy way to fasten the heat sink and reflector to one another. Furthermore, this enables the torque applied when the screw is secured or tightened to act on the heat sink at least via a screw head, which takes along the heat sink to some extent and places the circuit board, fastened to the heat sink, against the first referencing structure or the second referencing structure. This is a particularly simple way of creating the reference position and compensating for possible manufacturing tolerances.

In addition, it can be provided that a clamping force, imparted by the screw, between the heat sink and the reflector secures the first referencing structure and/or the second referencing structure of the reflector against the circuit board. The clamping force accordingly prevents the first referencing structure and/or the second referencing structure from detaching from the circuit board and leaving the reference position of the at least one illuminating device in the direction of the Y-axis and the X-axis relative to the reflector.

It can be provided that the reflector has the first referencing structure formed as a projection extending in the direction along the Z-axis from the reflector and/or the reflector has the second referencing structure formed as a projection extending in the direction along the Z-axis from the reflector. The first referencing structure and/or the second referencing structure can be formed in one piece with the reflector. One or both projections can be in the form of a prong.

Further, it can be provided that the first referencing structure is disposed in a first recess of the heat sink and is placed against a wall of the circuit board, so that the first referencing structure is placed against the circuit board in a direction along the Y-axis and/or along the X-axis. The recess of the heat sink can be formed as a hole in the heat sink. The hole can also be made as an elongated hole.

It can be provided in this case that the first referencing structure is placed against a wall of a notch-shaped recess of the circuit board. The notch-shaped recess enables the first referencing structure to rest evenly on the circuit board. The freedom of design for the contour or shape of the circuit board is thus hardly or not at all restricted.

It can also be provided that the second referencing structure is disposed in a third recess of the circuit board and is placed against a wall of the third recess, so that the second referencing structure is placed against the circuit board in a direction along the Y-axis and/or along the X-axis. In this case, the third recess can be formed as a hole, for instance, a round hole. The second referencing structure can be passed further through a second recess of the heat sink. The second referencing structure can thus be guided past the heat sink or within the heat sink.

Furthermore, it can be provided that the heat sink is formed as a cooling plate, in particular as a cooling sheet. This enables a simple, flat contact of the circuit board with the heat sink. Accordingly, the circuit board can be placed flat against the heat sink.

It can be provided that the circuit board is fastened to the heat sink by at least one second fastener such that the at least one illuminating device is located in a reference position in the direction along the Z-axis relative to the reflector.

The need for a suitably constructed fastening of the circuit board to the reflector for referencing in the direction along the Z-axis, which would require a larger and thus more cost-intensive circuit board, is avoided due to the fact that the illuminating device of the circuit board takes up the reference position in the direction along the Z-axis relative to the reflector via the fastening to the heat sink. Instead, the reference position in the direction along the Z-axis is supplied via the heat sink, which itself can again be larger than the circuit board, in order to provide more surface area for cooling, so that it can be easily fastened, in particular screwed, to the reflector. This establishing of the reference position along the Z-axis between the heat sink and the reflector consequently makes it possible that the circuit board can be relatively small.

It can be provided that the formation of the reference position in the direction of the Y-axis and in the direction of the X-axis is carried out solely via the first referencing structure and/or the second referencing structure. In particular, it can be provided that the fastening of the circuit board to the heat sink via the at least one second fastener does not form a reference position in the direction along the X-axis or Y-axis. Accordingly, the reference position can be formed by fastening the circuit board to the heat sink solely in the direction along the Z-axis.

In particular, it can be provided that a reference position of the at least one illuminating device is not formed in the direction along the Z-axis relative to the reflector via fastening of the circuit board to the reflector. Accordingly, it can also be provided that the circuit board is referenced to or placed against the reflector via the first referencing structure and/or the second referencing structure such that the at least one illuminating device is located in a reference position only in the direction of the Y-axis and in the direction of the X-axis, but not in the direction of the Z-axis, relative to the reflector. As a result, the referencing of the circuit board or the illuminating device located thereon in the direction along the Z-axis relative to the reflector is left solely to the at least one first fastener via the heat sink. The circuit board can be manufactured accordingly small and inexpensively.

It can also be provided that the reference position in the direction along the Z-axis of the at least one illuminating device relative to the at least one reflector is ensured solely by fastening the circuit board to the heat sink via the at least one second fastener. The circuit board area required for referencing in the direction along the Z-axis on the reflector can then be omitted, and the light module can be produced more economically due to the smaller circuit board. In addition, it is possible that the circuit board is not screwed to the reflector. The circuit board area required for a screw connection is then deliberately omitted in order to make the circuit board as small as possible.

It can be provided further that at least one reflector surface of the reflector extends transversely relative to the circuit board. The reflective surface can extend in height in the direction along the Z-axis. In particular, the at least one reflector surface of the reflector can extend substantially perpendicular to the circuit board. This provides a structure in which the reflector and the circuit board are in any case not parallel to one another. In such a case, the reflector and the circuit board could possibly be screwed together to ensure the reference position in the direction along the Z-axis. In an embodiment as described above, in contrast, this is not so easily possible, so that the invention is particularly suitable for making the circuit board practicable at low cost.

In addition, it can be provided that the circuit board has at least two illuminating device and the light module has at least two reflector surfaces, wherein each of the at least two illuminating device is located in a reference position in directions along the Y-axis, X-axis, and Z-axis relative to one of the at least two reflector surfaces. The reflector can be formed in one piece with the reflector surfaces and a common reflector base body. In particular, the two reflector surfaces can be separate from one another. This allows for an advantageous design in which the illuminating device can be spaced farther apart on the circuit board.

Furthermore, it may be provided that the at least one second fastener is a rivet. This enables an easy, secure, and cost-effective fastening.

Moreover, it can be provided that the heat sink extends with a front section in the direction along the X-axis in front of at least one reflector surface of the reflector. In addition, the heat sink may have a back section. The heat sink can be fastened to the reflector at the back section.

It can be provided in this case that the circuit board is fastened to the heat sink in the front section. This enables the circuit board to be fastened to the heat sink far from the reflector.

It can be provided hereby that the circuit board is located with a predominant surface on the front section of the heat sink. This minimizes or avoids a potential surface of the circuit board on the back section of the heat sink or on the reflector, a surface that could otherwise be used solely for fastening to the reflector, thereby reducing the cost of the circuit board.

According to a second aspect of the invention, the aforementioned object is achieved by a headlight for a motor vehicle having a headlight housing, a light-transmitting headlight cover lens disposed on the headlight housing, and a light module according to the first aspect of the invention. The light module can be disposed on the headlight housing and/or at a distance from the light-transmitting headlight cover lens. The light-transmitting headlight cover lens can be a plastic cover lens.

According to a third aspect of the invention, the aforementioned object is achieved by a motor vehicle having at least one headlight according to the second aspect of the invention.

According to a fourth aspect of the invention, the aforementioned object is achieved by a method for producing the light module according to the first aspect of the invention with the steps: fastening the circuit board to the heat sink and fastening the heat sink to the reflector via the first fastener such that the first referencing structure and/or the second referencing structure of the reflector are secured, in particular placed, against the circuit board, so that the at least one illuminating device is located in the reference position in the direction of the Y-axis and in the direction of the X-axis relative to the reflector.

It can be provided thereby that the method further has the step: moving the heat sink relative to the reflector when the heat sink is fastened to the reflector via the first fastener such that the first referencing structure and/or the second referencing structure of the reflector are placed against and secure the circuit board fastened to the heat sink. It would also be possible to speak of an operative connection between the fastening of the first fastener and the contact of the first referencing structure and/or the second referencing structure with the circuit board.

It can be provided further that the first fastener is a screw which is mounted in a thread of the reflector, wherein the method further has the steps: inserting the screw through a through hole in the heat sink and screwing the screw into the thread of the reflector, and tightening the screw on the heat sink to fasten the heat sink to the reflector such that a torque applied to the screw takes along the heat sink relative to the reflector in the direction of rotation of the screw, and thereby places and secures the first referencing structure and/or the second referencing structure against the circuit board.

It can be provided in this regard that, of a plurality of first fastener that fasten the heat sink to the reflector, the fastener is fastened first that causes the first referencing structure and/or the second referencing structure to be placed against and to secure the circuit board. Accordingly, this fastener can be determined in its position relative to the first referencing structure and/or the second referencing structure such that it is the first fastener to be fastened from among the plurality of first fastener.

Accordingly, it can be provided that, of a plurality of screws fastening the heat sink to the reflector, the screw is tightened first that causes the torque applied to it during tightening to move the heat sink and thus the circuit board in the direction of the first referencing structure and/or the second referencing structure and to place them against the circuit board. Accordingly, multiple screws can be used to fasten the heat sink to the reflector at multiple positions.

The invention will be explained in more detail hereinbelow with reference to the accompanying drawings. All features, including structural details and spatial arrangements, emerging from the claims, description, or figures can be essential to the invention both alone and in the any number of different combinations.

Elements with the same function and/or mode of operation are each provided with the same reference characters in the figures. If there is more than one element of the same type in one of the figures, the elements are numbered in ascending order, wherein the ascending number of the element is separated from the reference character by a period.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
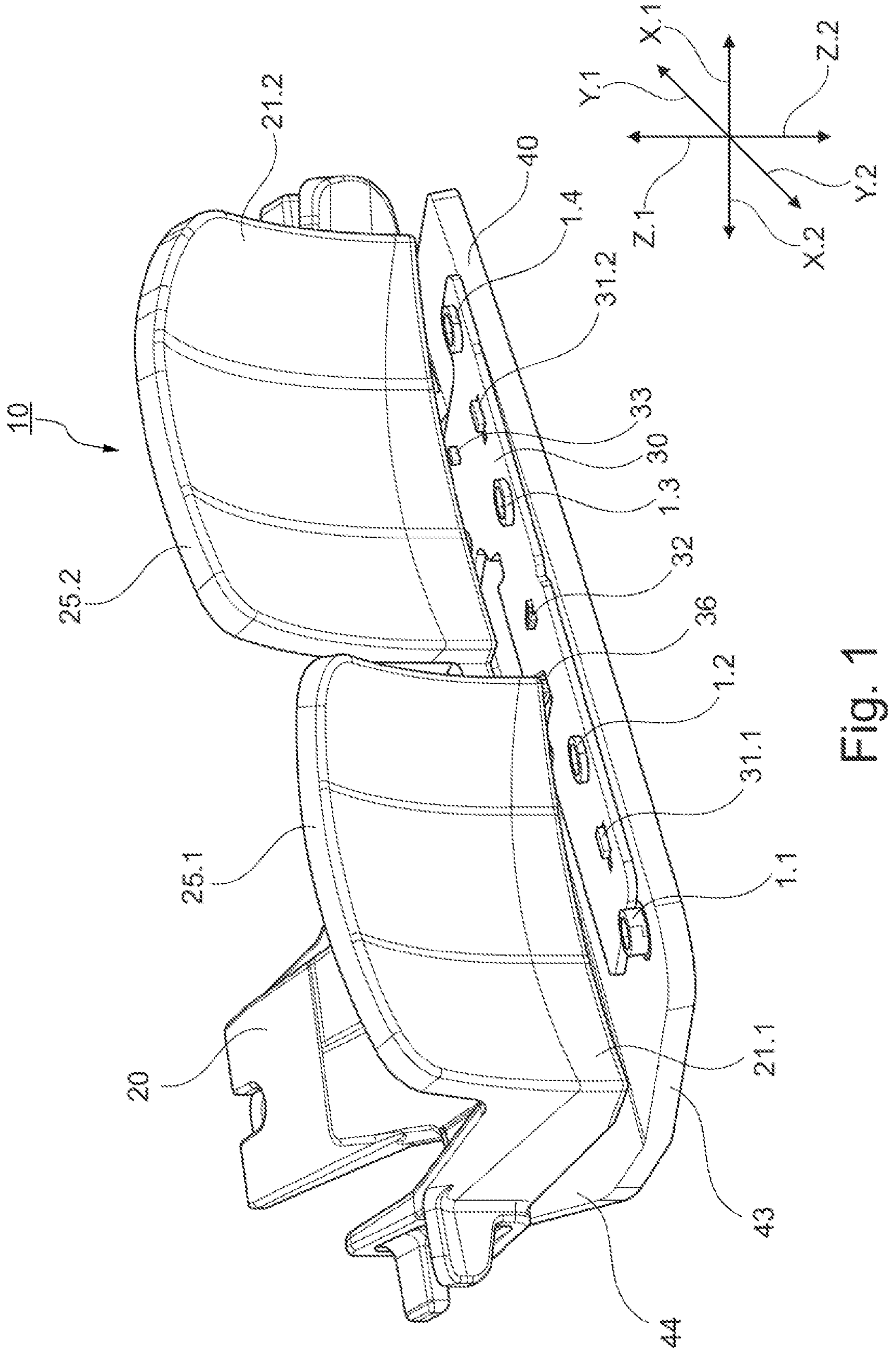
FIG. 1 shows a perspective view of a light module according to an exemplary embodiment of the invention.

FIG. 1 shows a perspective view of a light module 10 according to an exemplary embodiment of the invention. Light module 10 has a reflector 20, a heat sink 40, and a circuit board 30. Here, reflector 20 has reflector parts 25.1, 25.2, each of which has a separate reflector surface 21.1, 21.2. Alternatively, reflector 20 can have only one reflector part 25 having a reflector surface 21 or multiple reflector parts 25 having reflector surfaces 21.

Figure 2:
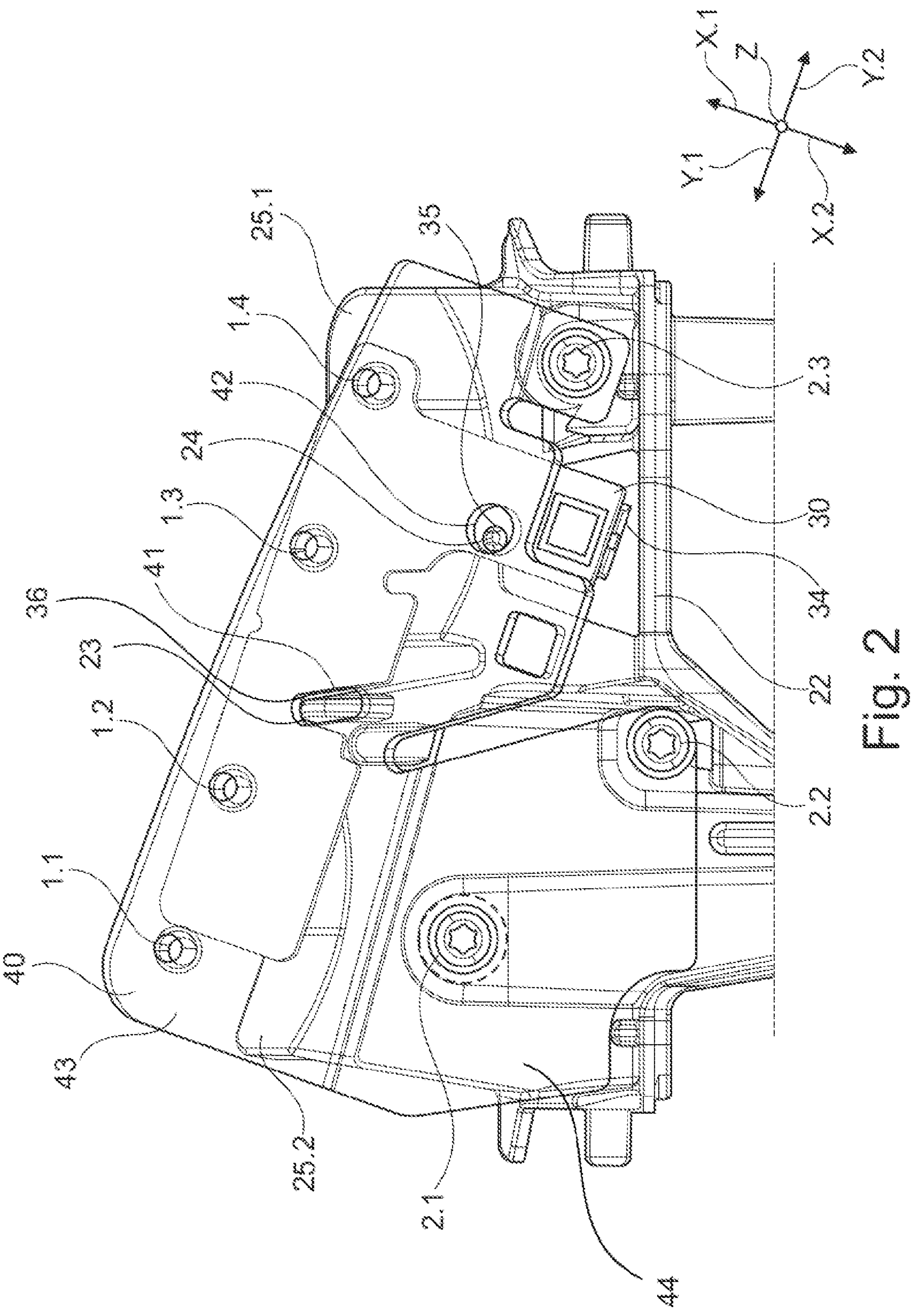
FIG. 2 shows a bottom view of the light module from FIG. 1.

A coordinate system with axes perpendicular to one another is depicted at the bottom right in FIGS. 1 and 2. The axes perpendicular to one another are an X-axis, a Y-axis, and a Z-axis. Each of these axes has two directions along the axis that are opposite to one another. The X-axis has the directions X.1, X.2, the Y-axis has the directions Y.1, Y.2, and the Z-axis has the directions Z.1, Z.2.

As can be seen in FIG. 2, reflector parts 25.1, 25.2 have a common reflector base body 22 or reflector 20 has a reflector base body 22. Reflector base body 22 extends in the direction X.2 away from reflector parts 25.1, 25.2. Reflector parts 25.1, 25.2 or reflector surfaces 21.1, 21.2 extend in the direction Z.1 according to their height. Further, reflector 20 has a first referencing structure 23 and a second referencing structure 24 extending as projections from reflector 20 in the direction Z.2. In the present case, the projections are shaped as prongs. In this case, one each of first referencing structure 23 and second referencing structure 24 is located on or near one each of reflector parts 25.1, 25.2.

Heat sink 40 is formed as a cooling plate, in particular as a cooling sheet. Heat sink 40 has a first recess 41 in the form of a hole and a second recess 42 in the form of a hole, as can be seen in FIG. 2. Further, heat sink 40 has a front section 43 and a back section 44. Back section 44 is located in front of reflector surfaces 21.1, 21.2 in the direction X.1 corresponding to the direction of the light reflected from reflector surfaces 21.1, 21.2, and thus not in an area of the light reflected from reflector 20. Reflector 20 is fastened to back section 44 of heat sink 40 via second fastener 2.1, 2.2, 2.3. Front section 43, in contrast, is located behind reflector surfaces 21.1, 21.2 in the direction X.1. Thus, illuminating device 31.1, 31.2 on circuit board 30, fastened to front section 43 of heat sink 40, can emit light onto reflector surfaces 21.1, 21.2. Front section 43, unlike back section 44, thus lies in the area of the light reflected from reflector 20.

Circuit board 30 has two illuminating device 31.1, 31.2. Only one illuminating device 31 or multiple illuminating device 31 can also be provided. This can be the case in particular with only one reflector surface 21. Circuit board 30 also has further electric elements 32, 33, such as, for example, a resistor 32 and a temperature sensor 33. Illuminating device 31.1, 31.2 are located opposite a contact surface of circuit board 30 placed against heat sink 40. A connector 34 is located on circuit board 30 for connecting a power supply source for supplying power to illuminating device 31.1, 31.2.

Circuit board 30 is fastened to heat sink 40 by a plurality of second fastener 1.1, 1.2, 1.3, 1.4. In the present case, second fastener 1.1, 1.2, 1.3, 1.4 are rivets. Via second fastener 1.1, 1.2, 1.3, 1.4, a reference position of circuit board 30 is made with illuminating device 31.1, 31.2 relative to reflector 20 in the direction Z.1. In this reference position or location of circuit board 30, circuit board 30 cannot be moved with respect to reflector 20. This is achieved by also having heat sink 40 being fastened to reflector 20 or their common reflector base 22. This becomes clear from FIG. 2.

FIG. 2 shows a bottom view of the light module from FIG. 1. Heat sink 40 is shown only with its outlines or transparent, so as not to obscure the view of reflector 20, lying below it in this perspective, or of reflector base body 22.

Reflector base body 22 or reflector 20 is connected to heat sink 40 via three first fastener 2.1, 2.2, 2.3, screws in the present case. The number of first fastener 2.1, 2.2, 2.3 can be varied. Via this fastening, heat sink 40 is set or referenced relative to reflector 20 in each of the directions along all of the axes X, Y, and Z. The reference position in direction Z.1 of circuit board 30 with respect to reflector 20 is thereby ensured via heat sink 40. Fastening of circuit board 30 to reflector 20 to set the reference position in the Z.1 direction does not occur. No area is provided on circuit board 30 for this purpose, as will be discussed in more detail later with reference to FIG. 3.

First referencing structure 23 of reflector 20 is passed through first recess 41 of heat sink 40 and is placed against a wall of a notch-shaped recess 36 of circuit board 30, so that heat sink 40 is fixed or referenced to reflector 20 in the Y.1 direction and the X.1 direction. This occurs in the assembly process via screw 2.1. When screw 2.1 is tightened in a thread in reflector 20 or reflector base body 22, the applied torque takes along heat sink 40 and thereby places circuit board 30, fastened to it, against first referencing structure 23. Of the plurality of screws 2.1, 2.2, 2.3 fastening heat sink 40 to reflector 20, screw 2, in the present case screw 2.1, is tightened first, which is the one that causes the torque applied to it during tightening to move heat sink 40 and thus circuit board 30 in the direction of first referencing structure 23 and/or second referencing structure 24, and to place and secure them against circuit board 30.

The clamping force of screw 2.1 secures the contact of first referencing structure 23 and/or second referencing structure 24 with circuit board 30, and thus provides a static overdetermination of the system. The direction of rotation of screw 2 can also be selected accordingly for the referencing. Thus, a left-hand or right-hand thread can be used to specify the direction in which heat sink 40 is taken, when screw 2 is tightened, and thus screw 2 to be tightened first. Here, first recess 41 is formed elongated or as an elongated hole. This enables ample compensation of manufacturing tolerances for guiding the projection therein.

Further, second referencing structure 24 of reflector 20 is passed through second recess 42 of heat sink 40 and a third recess 35 of circuit board 30 and is placed against a wall of third recess 35, so that circuit board 30 is fixed or referenced to reflector 20 in the Y.1 direction and the X.1 direction. Referencing in a direction along the Z-axis of circuit board 30 at reflector 20 or reflector base body 22 does not take place, because no surface of circuit board 30 opposite thereto is provided for this purpose, in order to keep circuit board 30 small and inexpensive. This is illustrated in FIG. 3.

Figure 3:
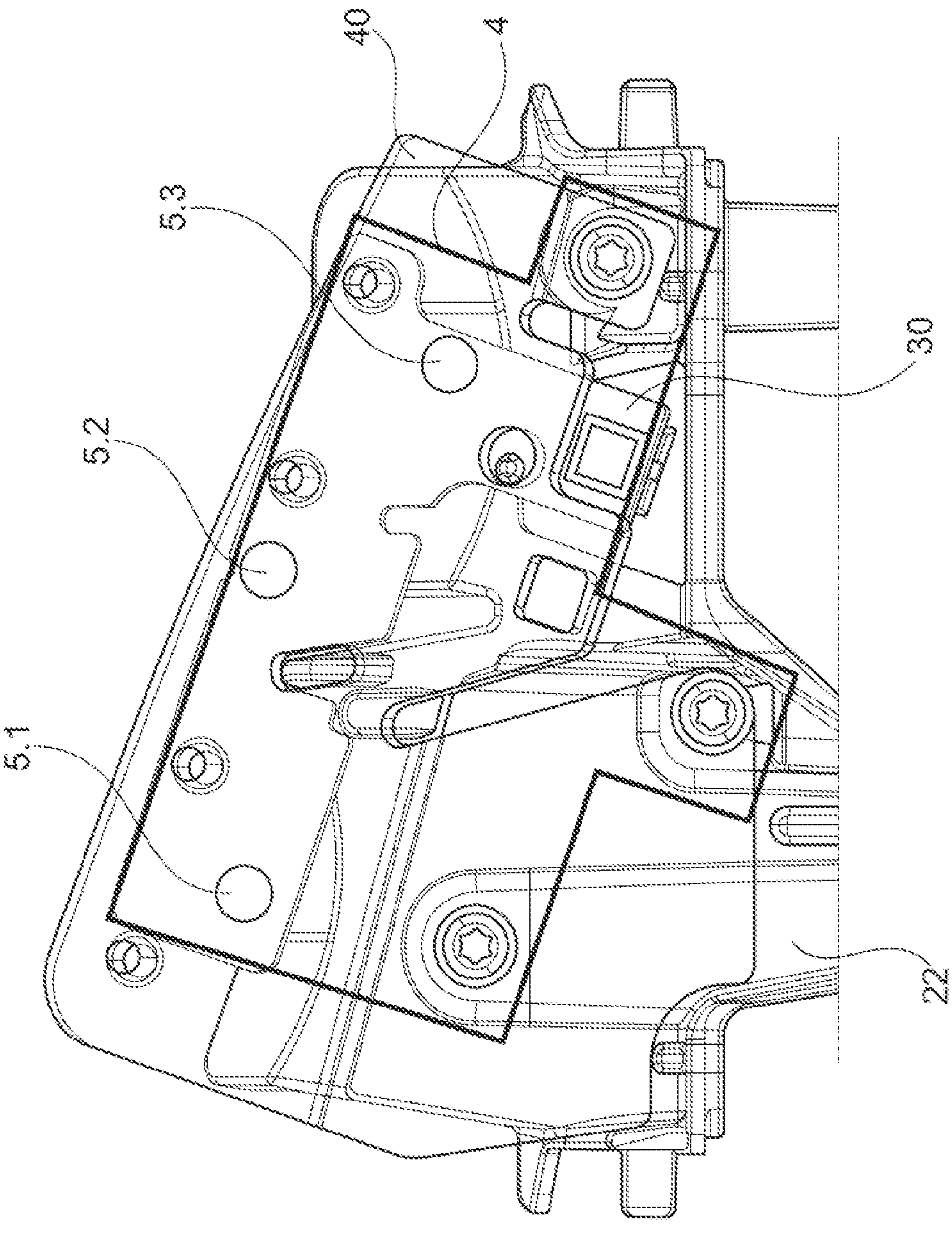
FIG. 3 shows the bottom view of the light module from FIG. 2 with an indication of the difference relative to the prior art.

FIG. 3 shows the bottom view of light module 10 from FIG. 2 with an indication of the difference to the prior art. Potential fastening positions 5.1, 5.2, 5.3, selected as examples, on circuit board 30 indicate that it is not possible to fasten circuit board 30 to reflector 20 at this location, which would enable the required reference position to be established in the direction of the Z-axis, because such a fastening would be in the area of the light reflected from reflector 20.

To fasten circuit board 30 to reflector 20, circuit board 30 would have to be considerably enlarged. The contours of such an enlarged circuit board 30, as would be used in accordance with the prior art, are shown as an outline 4 in FIG. 3. The outline 4 would then extend correspondingly to screws 2.1, 2.2, 2.3 in order to fasten circuit board 30 together with heat sink 40 and reflector 20 in the direction along all axes X, Y, Z. This requires a very large circuit board 30, which is correspondingly expensive. Via the solution presented here, in contrast, circuit board 30 can be produced much smaller, as shown in FIG. 3, in order to save costs.

Figure 4:
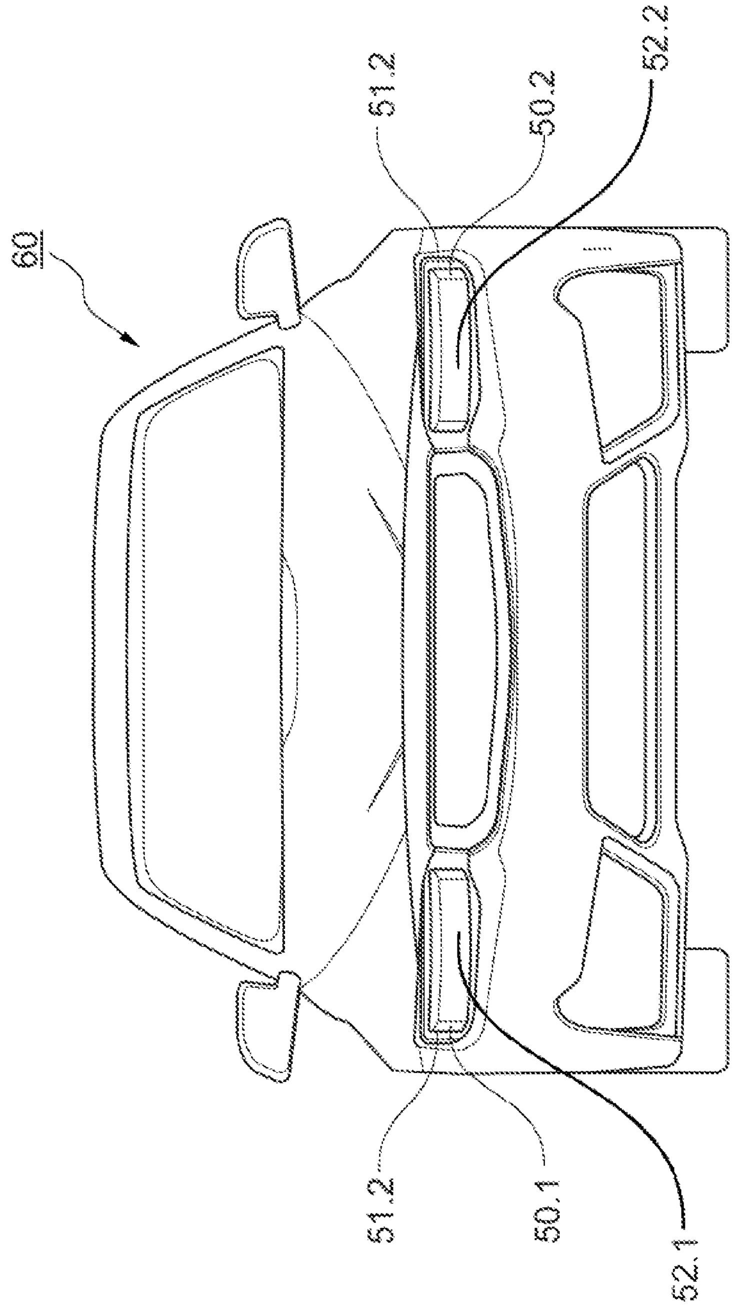
FIG. 4 shows a front view of a motor vehicle according to an exemplary embodiment of the invention.

FIG. 4 shows a front view of a motor vehicle 60 according to an exemplary embodiment of the invention. Motor vehicle 60 has two headlights 50.1, 50.2 according to an exemplary embodiment of the invention. Headlights 50.1, 50.2 each have light module 10 from FIG. 1, a headlight housing 51.1, 51.2, and a headlight cover lens 52.1, 52.2.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A light module for a headlight of a motor vehicle, the light module comprising:

a circuit board having at least one illuminating device to emit light, wherein the circuit board has a longitudinal extent along a Y-axis, a width extent, extending perpendicular to the longitudinal extent, along an X-axis, and a vertical extent, extending perpendicular to the longitudinal extent and the width extent, along a Z-axis;

a reflector; and a heat sink on which the circuit board is fastened, the heat sink being fastened to the reflector via a first fastener such that the first fastener secures a first referencing structure and/or a second referencing structure of the reflector against the circuit board such that the at least one illuminating device is located in a reference position in the direction of the Y-axis and in the direction of the X-axis relative to the reflector, wherein a position at which the first fastener fastens the heat sink to the reflector is offset from a position of each of the first referencing structure and/or the second referencing structure, such that the first fastener is spaced apart from each of the first referencing structure and/or the second referencing structure, and wherein the circuit board is fastened to the heat sink by at least one second fastener such that the at least one illuminating device is located in the reference position in the direction along the Z-axis relative to the reflector, wherein the at least one second fastener has a different structure than the first fastener, the first referencing structure and the second referencing structure.

2. The light module according to claim 1, wherein the first fastener is a screw mounted in a thread of the reflector.

3. The light module according to claim 2, wherein a clamping force, imparted by the screw, between the heat sink and the reflector secures the first referencing structure and/or the second referencing structure of the reflector against the circuit board.

4. The light module according to claim 1, wherein the reflector has the first referencing structure formed as a projection extending from the reflector in the direction along the Z-axis, and/or wherein the reflector has the second referencing structure formed as a projection extending from the reflector in the direction along the Z-axis.

5. The light module according to claim 1, wherein the first referencing structure is disposed in a first recess of the heat sink and is placed against a wall of the circuit board so that the first referencing structure is placed against the circuit board in a direction along the Y-axis and/or along the X-axis.

6. The light module according to claim 5, wherein the wall against which the first referencing structure is placed is a wall of a notch-shaped recess of the circuit board.

7. The light module according to claim 5, wherein the first recess of the heat sink is an elongated hole.

8. The light module according to claim 7, wherein the second referencing structure is disposed in a second recess of the heat sink, the second recess being a circular hole.

9. The light module according to claim 1, wherein the second referencing structure is disposed in a recess of the circuit board and is placed against a wall of the recess, so that the second referencing structure is placed against the circuit board in a direction along the Y-axis and/or along the X axis.

10. The light module according to claim 1, wherein the heat sink is formed as a cooling plate or as a cooling sheet.

11. A headlight for a motor vehicle comprising a headlight housing, a light transmitting headlight cover lens disposed on the headlight housing, and the light module according to claim 1.

12. A motor vehicle comprising at least one of the headlight according to claim 11.

13. A method for producing the light module according to claim 1, the method comprising:

fastening the circuit board to the heat sink;

fastening the heat sink to the reflector via the first fastener such that the first referencing structure and/or the second referencing structure of the reflector are secured against the circuit board so that the at least one illuminating device is located in the reference position in the direction of the Y-axis and in the direction of the X-axis relative to the reflector; and fastening the circuit board to the heat sink by at least one second fastener such that the at least one illuminating device is located in the reference position in the direction along the Z-axis relative to the reflector.

14. The method according to claim 13, wherein the method further comprises:

moving the heat sink relative to the reflector when the heat sink is fastened to the reflector via the first fastener such that the first referencing structure and/or the second referencing structure of the reflector are placed against and secure the circuit board fastened to the heat sink.

15. The method according to claim 13, wherein the first fastener is a screw which is mounted in a thread of the reflector, and wherein the method further comprises:

inserting the screw through a through hole in the heat sink and screwing the screw into the thread of the reflector; and tightening the screw on the heat sink to fasten the heat sink to the reflector such that a torque applied to the screw takes along the heat sink relative to the reflector in the direction of rotation of the screw and thereby places and secures the first referencing structure and/or the second referencing structure against the circuit board.

16. The method according to claim 13, comprising a plurality of the first fastener that fasten the heat sink to the reflector, wherein one of the first fasteners that is fastened first causes the first referencing structure and/or the second referencing structure to be placed against and to secure the circuit board.

17. The light module according to claim 1, wherein the first fastener is a screw and the at least one second fastener is a rivet.

* * * * *